(12) United States Patent
Rahman

(10) Patent No.: US 6,671,883 B1
(45) Date of Patent: *Dec. 30, 2003

(54) METHOD AND APPARATUS FOR LOST CONNECTIVITY RECOVERY

(75) Inventor: Moshiur Rahman, Freehold, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/461,934

(22) Filed: Dec. 15, 1999

(51) Int. Cl.⁷ .................................. H04N 7/173

(52) U.S. Cl. .................. 725/123; 725/109; 725/110; 379/221.03; 379/221.04; 370/216; 370/221

(58) Field of Search ................................ 725/123, 109, 725/110, 119, 107; 379/221.03, 221.04; 340/2.23; 370/10, 216, 221; 714/4

(56) References Cited

U.S. PATENT DOCUMENTS

| | | | | |
|---|---|---|---|---|
| 5,239,537 A | * | 8/1993 | Sakauchi | 370/218 |
| 5,751,789 A | * | 5/1998 | Farris et al. | 379/32.04 |
| 6,301,352 B1 | * | 10/2001 | Chung et al. | 379/229 |
| 6,442,614 B1 | * | 8/2002 | Rahman | 709/239 |
| 2002/0007492 A1 | * | 1/2002 | Smyth et al. | 379/229 |

* cited by examiner

Primary Examiner—Chris Grant
Assistant Examiner—Matthew Demicco

(57) ABSTRACT

The method and device carry out communication between a settop box and a target network through nay of a number of head ends. When a connectivity between the settop box and the target network through a first head end is lost, a call is initiated over a wireless communication link. A second, alternative, head end is selected based on the settop box, the first head end and the target network. Subsequently, the settop box is coupled through the second head end to the target network.

19 Claims, 7 Drawing Sheets

*FIG.* 6

METHOD AND APPARATUS FOR LOST CONNECTIVITY RECOVERY

BACKGROUND OF THE INVENTION

1. Field of Invention

This invention relates to communication apparatuses and methods. More particularly, this invention relates to connectivity recovery in a communication network.

2. Description of Related Art

When a cable TV (CATV) head end that interfaces with a settop box with an hybrid fiber coaxial (HFC) network loses connectivity with a public switch telephone network (PSTN), the Internet, or any other information or communication network, there is no known technique for recovering the lost connectivity.

SUMMARY OF THE INVENTION

Therefore, there is a need for apparatuses and methods for recovering a lost connectivity so that the down time and operation cost experienced because of the lost connectivity can be minimized.

According to exemplary embodiments of this invention, when a settop box determines that a connection with a communication network through a head end is lost, the settop box initiates a wireless connection to another head end that is coupled to the communication network. Additionally, the head end has the capability of determining whether a communication network connection has been lost.

Alternatively, a failure may occur at the communication link between the settop box and the head end. In such a situation, the settop box determines that the connection with the head end is lost and initiates a wireless connection to another head end so that the settop box may re-establish a connection with the communication network.

According to other exemplary embodiments of this invention, when a head end determines that a connection with a communication network is lost, the head end initiates a wireless connection to another head end that is coupled to the communication network.

These and other features and advantages of this invention are described in or are apparent from the following detailed description of the methods and apparatuses designed according to this invention.

BRIEF DESCRIPTION OF THE DRAWINGS

These and other objects of the present invention will be readily appreciated and understood from consideration of the following detailed description of exemplary embodiments of this invention, when taken together with the accompanying drawings, in which.

DETAILED DESCRIPTION OF PREFERRED EMBODIMENTS

Figure 1:
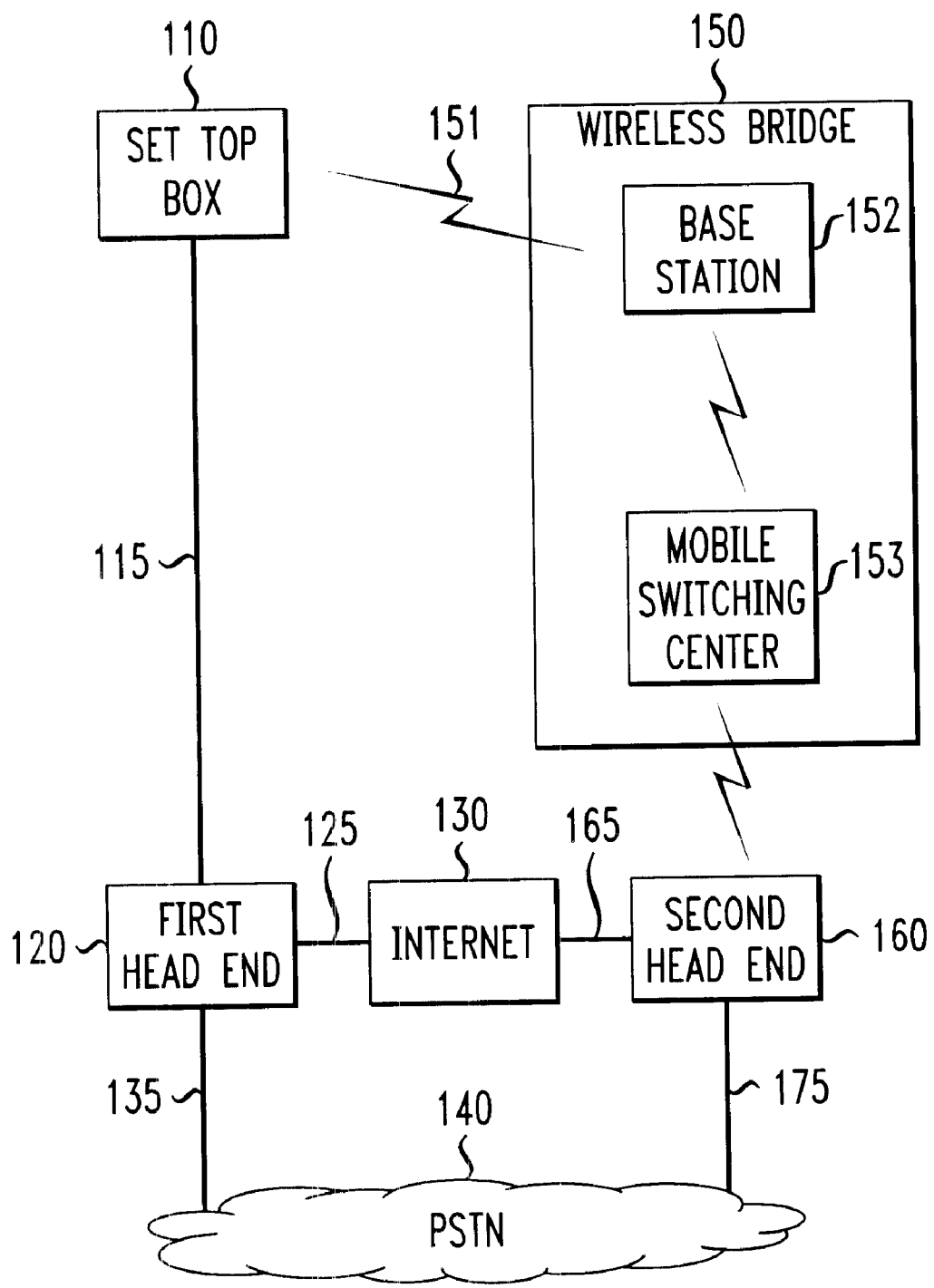
FIG. 1 is a schematic representation of one type of connectivity failure handled by the communication networks used in conjunction with connection recovery method and apparatus according to an exemplary embodiment of the invention.

FIG. 1 is a schematic representation of communication networks used in connection recovery methods and apparatuses according to an exemplary embodiment of this invention. In FIG. 1, a settop box 110 is coupled to a first head end 120 through a hybrid fiber coaxial line 115. The head end 120 is coupled to the Internet 130 through a communication link 125 and to the public switched telephone network 140 through a communication link 135.

The settop box 110 can also be coupled to a second head end 160 through a wireless bridge 150 including a wireless communication link 151, a base station 152 and a mobile switching center 153. The second head end 160 is coupled to the Internet 130, through a communication link 165 and to the PSTN 140 through a communication link 175.

The settop box 110 may be, for example, an electronic apparatus that a user can use to gain access to various communication networks, such as television networks, the Internet or public telephone networks. The first head end 120 includes termination equipment, for example a multiplexer and a demultiplexer, not shown. The first head end 120 aggregates data traffic, e.g., video, data, voice, address information, etc. downstream from the head end 120 to the settop box 110. Additionally, the settop box 110 aggregates data traffic upstream from the settop box 110 to the head end 120 for processing by the head end 120 or routing to the PSTN 140 or the Internet 130.

An explanation of one type of connectivity failure handled by the communication networks will now be explained with reference to FIG. 1. When the settop box 110 tries to gain access to a communication network, such as, for example, the PSTN 140 or the Internet 130, through the first head end 120, access may be denied because either the connectivity between the settop box 110 and the first head end 120 is lost or the connectivity between the first head end 120 and the communication network is lost.

To initiate connectivity recovery, when the settop box 110 determines that there is a failure in the connectivity to a targeted network, e.g., Internet 130 or PSTN 140, the settop box initiates a wireless call over a wireless bridge 150 and establishes connectivity with a second head end 160 having a viable connection with the target network. In this way, the settop box 110 re-establishes the connectivity with the target network that was lost because of the communication link failure between the first head end 120 and the settop box 110.

The wireless bridge 150 can include a portion of a wireless telephone network. For example, as shown in FIG. 1, the wireless bridge 150 may include wireless communication link 151 which is a wireless telephone communication link of a cellular telephone network. The wireless communication link 151 is coupled to a base station 152 that directs a call from the settop box 110 to a mobile switching center 153. The base station 152 may be, for example, a cell antenna of a cellular telephone network. The mobile switching center 153 receives the call from the settop box 110 and selects a second head end 160 from among all available head ends in the network. The selection is performed based on the identity of the settop box 110, established by a protocol address and based on the communication network to which the settop 110 is attempting to be coupled. For example, the mobile switching center 153 includes a database that comprises, for each couple of settop box 110 and communication network, e.g., Internet 130 or PSTN 140, that can be coupled together, a prioritized list of best second head ends 160. The mobile switching center 153 can also be a web server that allows queries into a database, not shown, located at the mobile switching center 153.

Once a second head end 160 is selected, the settop box 110 establishes connectivity with the selected second head end 160 so that the connection between the settop box 110 and the communication network is established through the selected second head end 160.

In FIG. 1, the communication links 125, 135, 165 and 175 can be any known or later developed device or system for connection, including a direct cable connection, a connection over a wide area network or a local area network, a connection over an intranet, a connection over the Internet, or a connection over any other distributed network or system. Further, it should be appreciated that the communication links 125, 135, 165 and 175 can each be a wired or a wireless communication link to a network.

An explanation of a second type of connectivity failure handled by the communication networks will now be explained with reference to FIG. 2. When the settop box 110 tries to gain access to a communication network, such as, for example, the PSTN 140 or the Internet 130, through the first head end 120, access may be denied because the connectivity between the first head end 120 and the communication network is lost.

To address such a connectivity failure, when the first head end 120 determines that there is a failure in the connectivity between the head end 120 and a target network, the first head end 120 initiates a wireless call via a wireless bridge 150 and establishes a connection with a second head end 160 having a viable connection with the network. The first head end 120 then establishes a connection with the second head end 160 so that the second head end 160 completes the lost connection between the settop box 110 and the target network.

The wireless bridge 150 can include a portion of a wireless telephone network. For example, as shown in FIG. 2, the wireless bridge 150 may include wireless communication link 251 which is a wireless telephone communication link of a cellular telephone network. The wireless communication link 251 is coupled to the base station 152 that directs a call from the first head end 120 to the mobile switching center 153. The mobile switching center 153 receives the call from the first head end 120 and selects a second head end 160 from among all available head ends in the network. The selection is performed based on the identity of the settop box 110, established by a protocol address and based on the communication network to which the settop 110 is attempting to be coupled. For example, the mobile switching center 153 includes a database that comprises, for each couple of settop box 110 and communication network, e.g., Internet 130 or PSTN 140, that can be coupled together, a prioritized list of best second head ends 160. The mobile switching center 153 can also be a web server that allows queries into a database, not shown, located at the mobile switching center 153.

Once the second head end 160 is selected, the first head end 120 establishes connectivity with the second head end 160 so that the connection between the settop box 110 and the target destination network through the first head end 120 is completed by the second head end 160.

Figure 2:
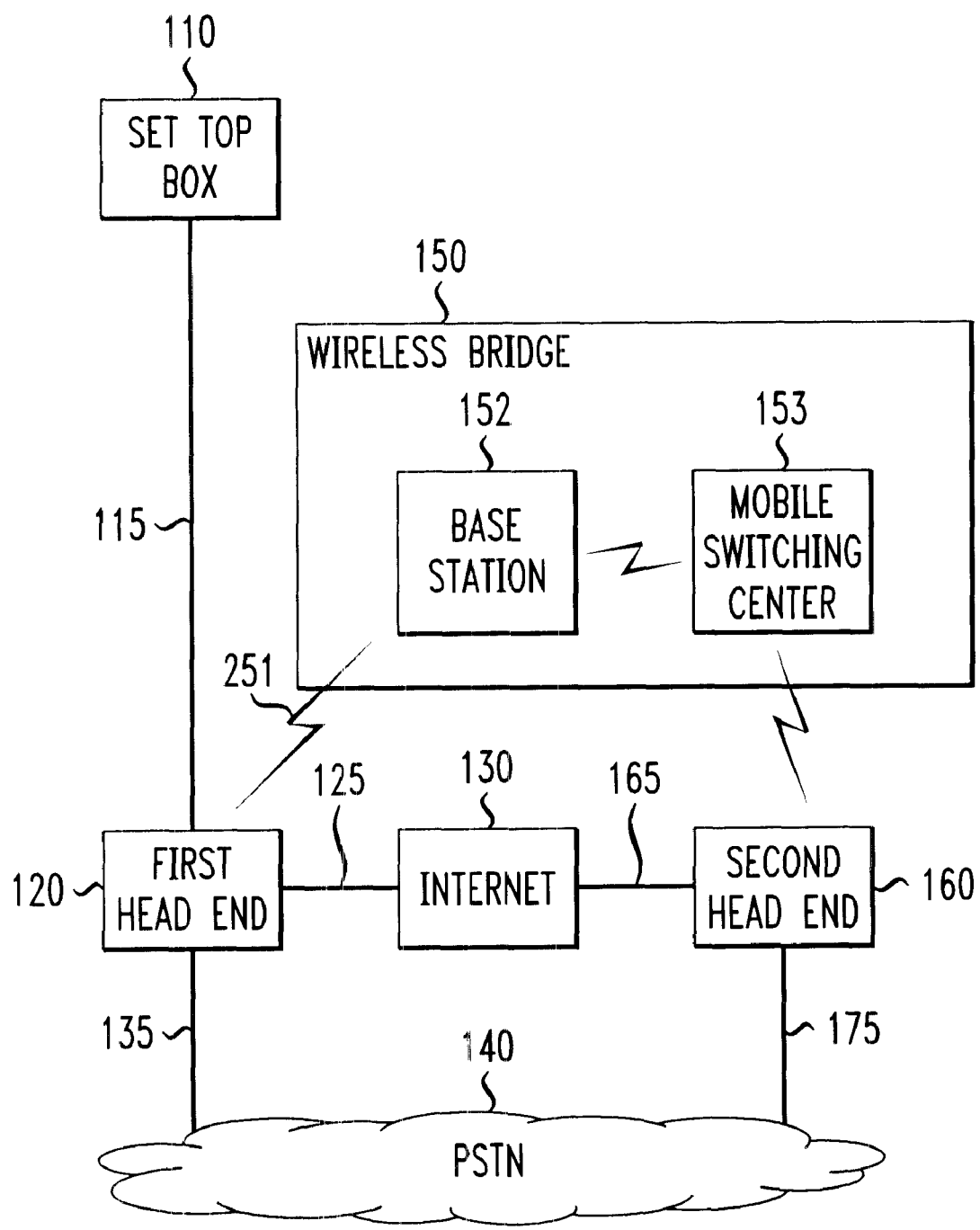
FIG. 2 is a schematic representation of a second type of connectivity failure handled by the communication networks used in conjunction with the connection recovering method and apparatus according to the exemplary embodiment of the invention.
Figure 3:
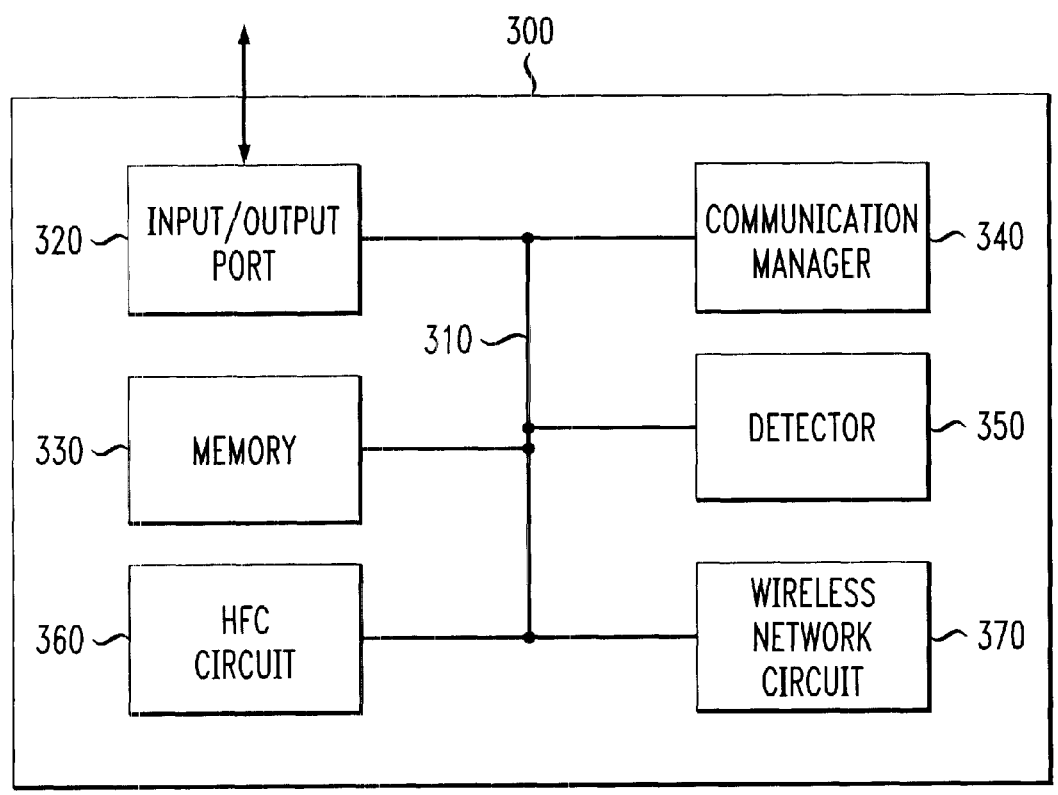
FIG. 3 is a schematic functional diagram of a connection recovery apparatus used in conjunction with the exemplary embodiment of this invention.

FIG. 3 is a schematic functional diagram of a connection recovery apparatus 300 used in the communication network shown in FIGS. 1 and 2. This connection recovery apparatus 300 can be embedded in either the settop box 110 or the head end 120.

As shown in FIG. 3, the connection recovery apparatus 300 includes an input/output port 320, a memory 330, a communication manager 340, a detector 350, an HFC circuit 360 and a wireless network interface circuit 370. Components 320, 330, 340, 350, 360 and 370 are coupled together by a control/data bus 310. The input/output port 320 is coupled to at least a an HC communication link and a wireless communication link. When the connection recovery apparatus 300 is embedded in a head end 120, the input/output port 320 is also coupled through at least one communication link to at least one communication network, such as the PSTN 140 and the Internet 130 shown in FIGS. 1 and 2. The input/output port 320 may be coupled to any number of the total number of communication networks to which the head end is coupled.

The memory 330 particularly stores a program run by the communication manager 340 and/or the detector 350 and data and addresses used by the communication manager 340 and/or the detector 350. The communication manager 340 and/or the detector 350 may be, in the exemplary embodiment of the connection recovery apparatus 300, a microprocessor that runs a program to implement exemplary embodiments of the methods and apparatuses according to this invention.

However, each of the communication manager 340 and the detector 350 can also be implemented on a special purpose computer, a programmed microcontroller and peripheral integrated circuit elements, an ASIC or other integrated circuit, a digital signal processor, a hardwire electronic or logic circuit such as a discrete element circuit, a programmable logic device such as a PLD, PLA, FPGA or PAL, or the like. In general, any device capable of implementing a finite state machine that is in turn capable of implementing the flowcharts shown in FIGS. 4 and 5 can be used to implement the communication manager 340 and/or the detector 350.

The HFC circuit 360 provides an interface between the HFC communication link and the communication manager 340. The wireless network interface circuit 370 provides an interface between the wireless communication link and the communication manager 340.

In operation, upon request of a user of a settop box 110, the communication manager 340 tries to establish a connection between the settop box 110 and a target network, such as a PSTN 140 or the Internet 130 through the head end 120. The detector 350 detects whether the connection is properly established, and, if so, continuously monitors the connection to determine if the connection has been lost or not. For example, the detector 350 monitors the signals received from the target network to which the settop box is coupled, and when no signal is received during a predetermined period, a connectivity failure is detected.

The detector 350 informs the communication manager 340 when the detector 350 detects that the connection is not properly established or that the connection is lost after having been properly established. In such circumstances, the communication manager 340 sends a message to the mobile switching center 153 identifying at least one target network to which the settop box 110 tries to be coupled, via the first head end 120 to the mobile switching center 153.

The mobile switching center 153 then returns an address of a second head end 160 to the communication manager 340. The communication manager 340 then initiates a connection with the second head end 160.

When a connection is established with a second head end 160, the communication manager 340 sends call completion information, including an identifier of the communication network to which the settop box 110 tries to be coupled, to the second head end 160.

Thus, the connection between the settop box 110 and the target network to which the settop box 110 tries to be coupled can be completed using the second head end 160. If this connection request using the second head end 160 fails, the process of calling the mobile switching center 153, selecting a new head end and establishing a connection to the network through the new selected head end can be repeated with as many head ends as are available in the network as many times as is necessary to establish a connection with the target network.

Figure 4:
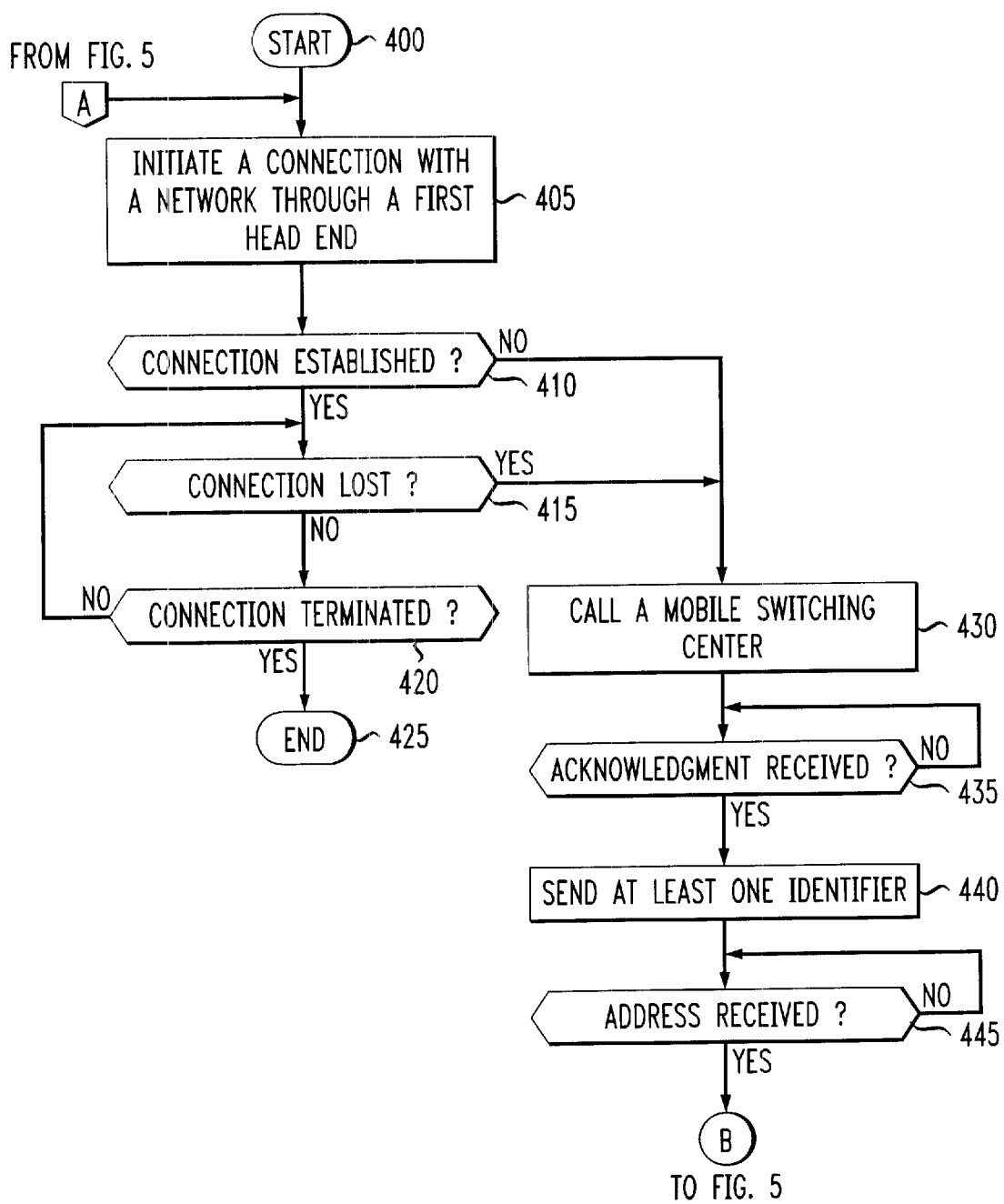
FIGS. 4 and 5 are flowcharts illustrating a connection recovery method according to an exemplary embodiment of this invention.
Figure 5:
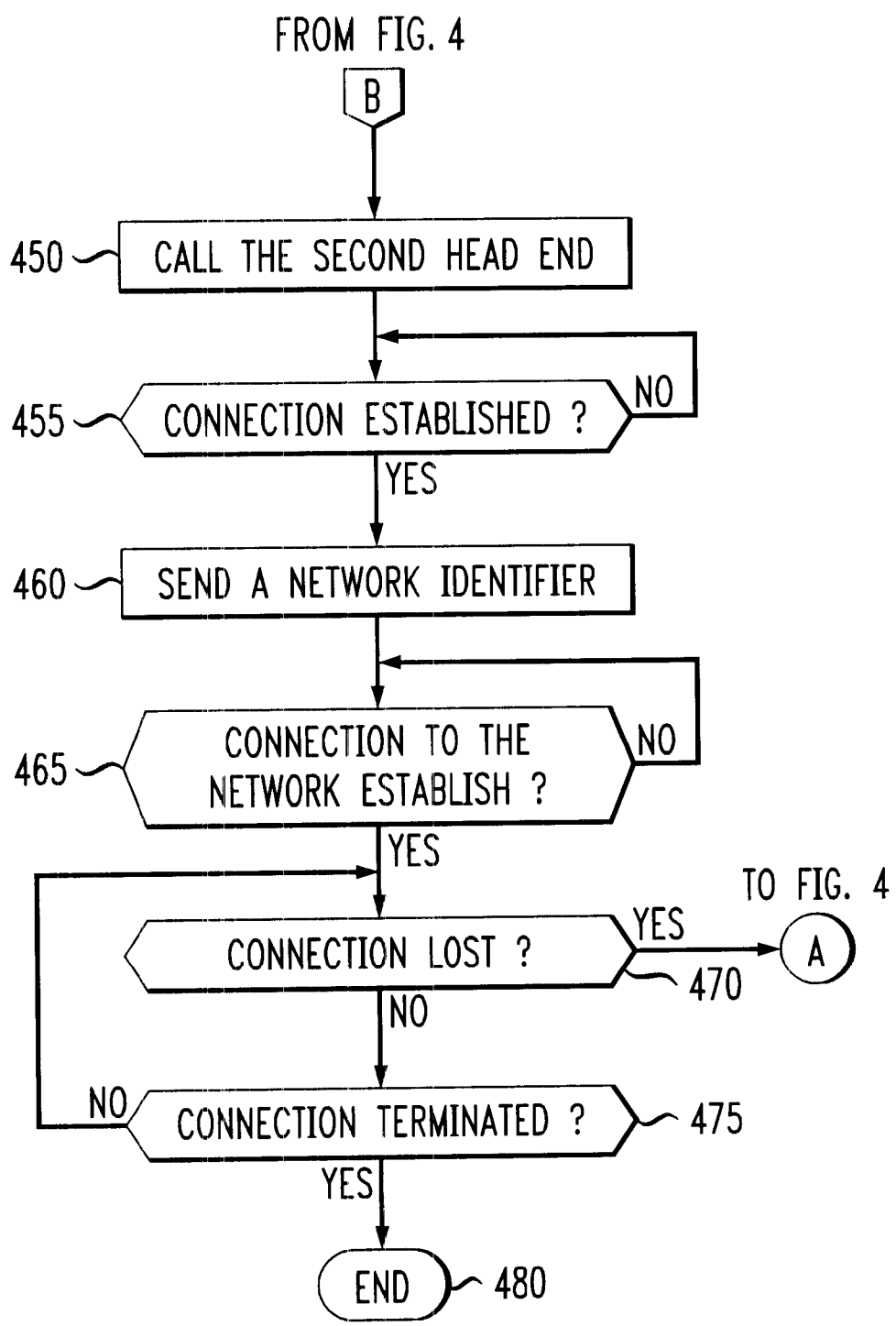

FIGS. 4 and 5 are flowcharts illustrating a connection recovering method according to an exemplary embodiment of this invention. The method begins in step 400 and control proceeds to step 405. In step 405, a connection is initiated between a settop box and a target network. Control then continues to step 410. In step 410, it is determined whether the initiated connection is established. If so, control continues to step 415. Otherwise, control jumps to step 430. In step 415, it is determined whether the connection is lost. If so, control jumps to step 430. Otherwise, control continues to step 420 where control determines if the connection has been voluntarily terminated by a user. If so, control continues to step 425 where the process ends. Otherwise, control returns to step 415.

In step 430, when it has been established that the connection has been lost, a call is initiated to a mobile switching center and control proceeds to step 435. In step 435, it is determined whether the connection with the mobile switching center is established by determining if an acknowledgment message is received from the mobile switching center. If so, control continues to step 440. Otherwise, control returns to step 435. In step 440, control sends to the mobile switching center an identifier of at least one of the settop box requesting access to a target network, the first head end previously handling access to the target network by the settop box and the target network. Control then proceeds to step 445.

In step 445, control determines if an address of a second head end has been received from the mobile switching center. If so, control continues to step 450. Otherwise, control returns to step 445. In step 450, a call is initiated to the second head end whose address has been received from the mobile switching center and control proceeds to step 455. As shown in FIG. 5, in step 455, it is determined whether the connection with the second head end is established. If so, control continues to step 460. Otherwise, control returns to step 455. In step 460, control sends to the second head end an identifier of the target network. Control then proceeds to step 465.

In step 465, control determines whether the initiated connection is established. If so, control continues to step 470. Otherwise control returns to step 465. In step 470, it is again determined whether a connection between the settop box and the target network has been lost. If so, control returns to step 405 to initiate the selection of another alternative head end and establishment of a connection to the target network using that alternative head end. Otherwise, control continues to step 475 in which it is determined if the connection has been voluntarily terminated by a user. If so, control continues to step 480 where the process ends. Otherwise, control returns to step 470 to perform monitoring.

Figure 6:
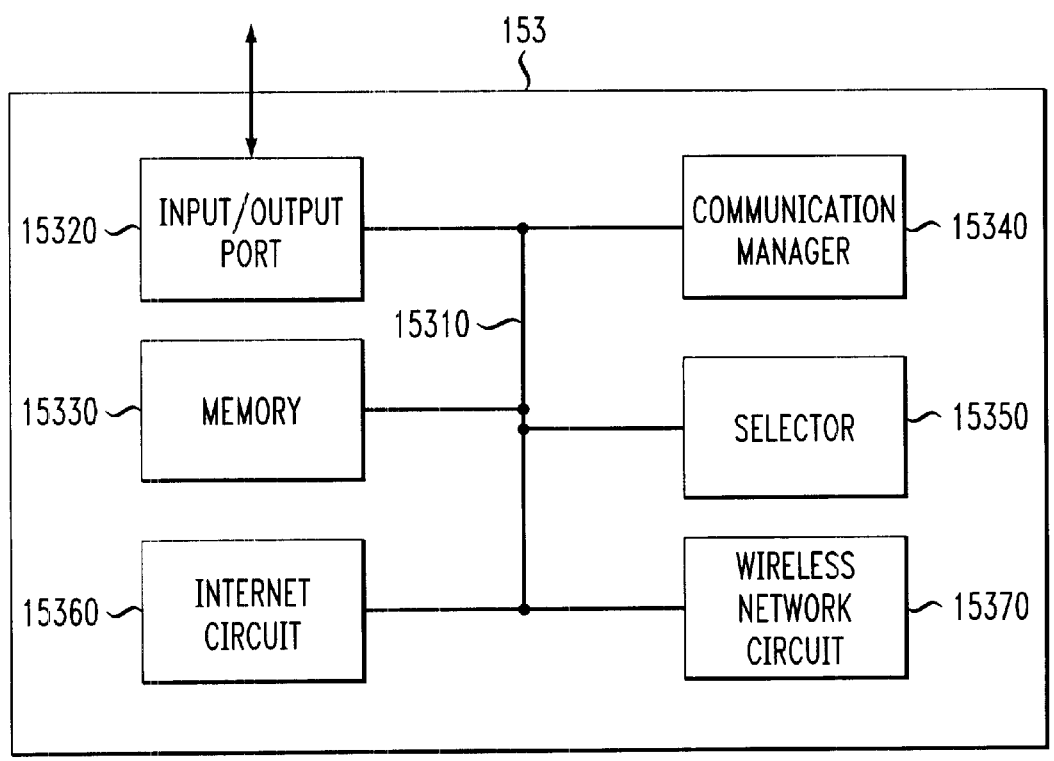
FIG. 6 is a schematic functional diagram of a mobile switching center according to an exemplary embodiment of this invention.

FIG. 6 is a schematic functional diagram of a mobile switching center 153 according to an exemplary embodiment of this invention. This mobile switching center 153 includes an input/output port 15320, a memory 15330, a communication manage 15340, a selector 15350, an Internet interface circuit 15360 and a wireless network interface circuit 15370. Components 15320, 15330, 15340, 15450, 15460 and 15370 are coupled together by a control/data bus 15310.

The memory 15330 particularly stores a program run by the communication manager 15340 and/or the selector 15350 and data and addresses used by the communication manager 15340 and/or the selector 15350. The communication manager 15340 and/or the selector 15350 may be realized in a microprocessor that runs a program to implement exemplary embodiments of the invention. However, each of the communication manager 15340 and the selector 15350 can also be realized in a special purpose computer, a programmed microcontroller and peripheral integrated circuit elements, an ASIC or other integrated circuit, a digital signal processor, a hardwire electronic or logic circuit such as a discrete element circuit, a programmable logic device such as a PLD, PLA, FPGA or PAL, or the like. In general, any device capable of implementing a finite state machine that is in turn capable of implementing the flowchart shown in FIG. 7 can be used to implement the communication manager 15340 and/or the selector 15350.

The Internet interface circuit 15360 provides protocol and data format information to allow the communication manager 15340 to interface with the Internet. The wireless network interface circuit 15370 provides protocol and data format information and processing to allow the communication manager 15340 to interface with a wireless network.

In operation, when the mobile switching center 153 receives a wireless call from a connection recovery apparatus 300 such as that shown in FIG. 3, the communication manager 15340 sends an acknowledgment message to the calling connection recovery apparatus 300 so that a connection is established between the connection recovery apparatus 300 and the mobile switching center 153.

Subsequently, the communication manager 15340 waits for a message including at least one of a settop box identifier, a first head end identifier and a target network identifier. Upon reception of such a message, the communication manager 15340 accesses a database, which is included in the memory 15330 or accessible through a network such as the Internet. The selector 15350 then selects a second head end based on at least one of the identifier of the settop box, the identifier of the first head end and the identifier of the target network. The selected second head end is different from the first head end and is capable of being coupled to both the settop box and the target network.

The mobile switching center 153 then returns to the connection recovery apparatus 300 an address of the second head end 160 and closes the connection with the connection recovery apparatus 300.

Alternatively, the mobile switching center 153 connects the connection recovery apparatus 300 to the selected second head end 160 and forwards to the second head end 160 an identifier of the target network.

Figure 7:
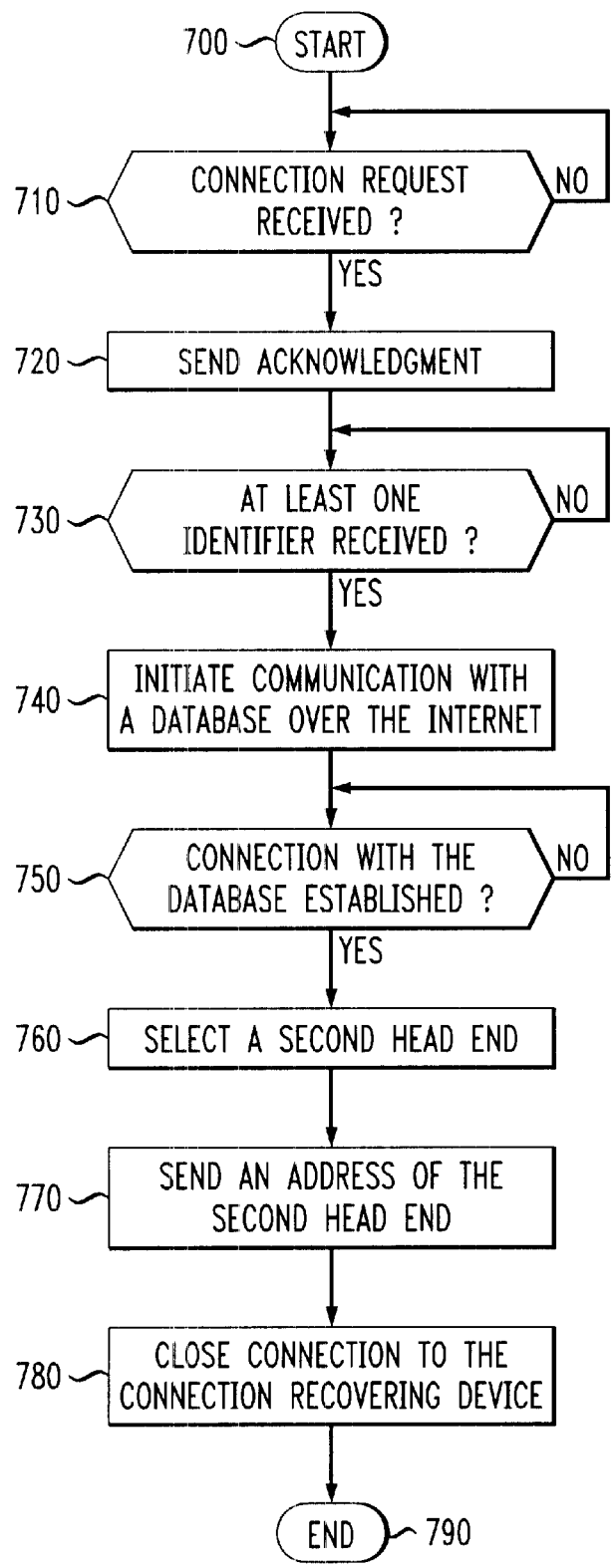
FIG. 7 is a flowchart illustrating operation of the mobile switching center during a connection recovery method according to an exemplary embodiment of this invention.

FIG. 7 is a flowchart illustrating operation of the mobile switching center used in a connection recovery operation method according to an exemplary embodiment of this invention. The method begins in step 700 and control proceeds to step 710. In step 710, it is determined whether a communication request is received. If so, control continues to step 720. Otherwise, control returns to step 710. In step 720, control sends an acknowledgment message to the sender of the communication request and control proceeds to step 730. In step 730, it is determined whether a message identifying at least one of a settop box, a first head end and a target network is received. If so, control continues to step 740. Otherwise, control returns to step 730. In step 740, communication is initiated with a database over the Internet. Next, in step 750, it is determined whether the connection over the Internet is established. If so, control continues to step 760. Otherwise, control returns to step 750. In step 760, a second head end is selected from a list of head ends in the database, based on at least one of a settop box identifier, a first head end identifier and a target network identifier and control proceeds to step 770. The selected second head end is different from the first head end and is capable of being coupled to both the settop box and the target network.

In step 770, a message to the connection recovery apparatus is sent including an address of the second head end. Control then continues to step 780 in which the connection with the connection recovery apparatus is terminated. Control then proceeds to step 790 where the operation method ends.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for implementing communication between a settop box and a target network through a second head end, comprising:

detecting, at a first head end, when a connectivity between the settop box and the target network through the first head end is lost;

initiating a call over a wireless communication link from the first head end to the second head end when a lost connectivity is detected at the first head end; and completing a connection between the second head end and the settop box to implement communication between the settop box and the target network.

2. The method of claim 1, wherein the call over the wireless communication link transmits at least one of an identifier of the settop box, an identifier of a first head end and an identifier of the target network.

3. The method of claim 1, wherein the call over the wireless communication link transmits an address of a second head end, the method further comprising initiating communication through the second head end.

4. The method of claim 3, wherein the communication through the second head end comprises transmitting an identifier of the target network to the second head end.

5. The method of claim 2, further comprising selecting a second head end based on at least one of the identifier of the settop box, the identifier of the first head end and the identifier of the target network.

6. The method of claim 1, further comprising:

receiving, over a wireless communication link, at least one of an identifier of the settop box, an identifier of the first head end and an identifier of the target network; and selecting the second head end based on at least one of the identifier of the settop box, the identifier of the first head end and the identifier of the target network.

7. The method of claim 6, further comprising transmitting an address of the second head end over the wireless communication link.

8. The method of claim 6, further comprising sending an identifier of the target network to the second head end.

9. An apparatus located at a first head end for implementing communication between a settop box and a target network through a second head end, the apparatus comprising:

a detector that detects when a connectivity between the settop box and the target network through the first head end is lost;

a wireless communication link; and a communication manager that initiates a call over the wireless communication link from the first head end to a second head end when the detector detects that the connectivity is lost.

10. The apparatus of claim 9, wherein the communication manager sends at least one of an identifier of the settop box, an identifier of the first head end and an identifier of the target network.

11. The apparatus of claim 9, wherein the communication manager receives an address of the second head end and initiates communication through the second head end.

12. The apparatus of claim 9, wherein the communication manager sends an identifier of the target network to the second head end.

13. The apparatus of claim 10, wherein the call over the wireless communication link is directed to a mobile switching devise.

14. The apparatus of claim 13, wherein the mobile switching device selects the second head end based on at least one of the identifier of the settop box, the identifier of the first head end and the identifier of the target network.

15. The apparatus of claim 13, wherein the mobile switching device connects the communication manager to the second head end.

16. The apparatus of claim 13, wherein the mobile switching device sends an address of a second head end to the communication manager.

17. The apparatus of claim 9, further comprising:

a wireless receiver that receives, over the wireless link, at least one of an identifier of a settop box, an identifier of the first head end and an identifier of the target network; and a selector that selects a second head end based on at least one of the identifier of the settop box, the identifier of the first head end and the identifier of the target network.

18. The apparatus of claim 17, further comprising a transmitter that transmits an address of the second head end over the wireless communication link.

19. The apparatus of claim 17, wherein the communication manager sends an identifier of the target network to the second head end.

* * * * *